United States Statutory Invention Registration [19]

[11] Reg. Number: H244

Goodwin [43] Published: Apr. 7, 1987

[54] METALLOGRAPHIC PREPARATION OF E-GLASS-EPOXY COMPOSITE MATERIAL

[75] Inventor: Eugene L. Goodwin, Huntsville, Ala.

[73] Assignee: The United States of America as represented by the Secretary of the Army, Washington, D.C.

[21] Appl. No.: 841,377

[22] Filed: Mar. 16, 1986

[51] Int. Cl.[4] ..... B24B 1/00
[52] U.S. Cl. ..... 51/281 R
[58] Field of Search ..... 51/209 DL, 281 R, 283 R, 51/284 R, 317, 318, 326

[56] References Cited

U.S. PATENT DOCUMENTS

| | | | |
|---|---|---|---|
| 1,487,024 | 3/1924 | Robinson | 51/209 DL |
| 2,554,070 | 5/1951 | Stead | 51/284 |
| 3,177,627 | 4/1965 | Guibert et al. | 51/135 X |
| 3,460,295 | 8/1969 | Teeter | 51/283 R |
| 3,488,895 | 1/1970 | Thompson | 51/283 R |
| 3,587,196 | 6/1971 | Dann | 51/283 R X |
| 3,662,500 | 5/1972 | Mendel | 51/326 X |
| 4,599,827 | 7/1986 | Goodwin | 51/326 |

*Primary Examiner*—Deborah L. Kyle
*Assistant Examiner*—Michael J. Carone
*Attorney, Agent, or Firm*—Harold W. Hilton; Freddie M. Bush

[57] ABSTRACT

A method of preparing samples of a E-glass-epoxy composite material for microscopic examination thereof comprising the steps of first rough grinding the sample to produce a flat surface, fine grinding the sample in a series of grinding steps, each step accomplished with a finer grit of fine grinding material to obtain a relatively flat, scratch-free surface and then polishing the sample in a single polishing step to produce a sample with a scratch-free polished surface.

3 Claims, 2 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METALLOGRAPHIC PREPARATION OF E-GLASS-EPOXY COMPOSITE MATERIAL

DEDICATORY CLAUSE

The invention described herein may be manufactured, used, and licensed by or for the Government for governmental purposes without the payment to me of any royalties thereon.

BACKGROUND OF THE INVENTION

Typically the technique for preparation of E-Glass-Epoxy composite material consists of hand polishing with a microcloth covered wheel with a slurry of water and 0.3 micron alumina and then with a microcloth covered wheel in a slurry of water and 0.05 micron alumina. Such preparation procedure does not give enough contrast between the E-Glass fibers and the epoxy matrix for microscopic examination since both materials are translucent.

The method of the preparation in accordance with the present invention provides for a flat, scratch-free, representative sample without overpolishing the fibers and epoxy so that good contrast may be obtained using oblique lighting when using a light optical metallograph for microscopic examination and documentation. Typically, such optical metallographs take pictures with a true magnification of up to 1600.

SUMMARY OF THE INVENTION

A method of preparation of an E-Glass-Epoxy composite material for microscopic examination is disclosed. The method includes selecting and encapsulating the sample in a support material, rough grinding the sample on a belt surfacer, fine grinding the sample on a pregrinder with water soluble oil as a lubricant and polishing the sample on a flat bronze wheel that is covered with a microcloth impregnated with a water slurry of aluminum powder and a liquid detergent. The polishing step is a single step which produces a finished sample of fine quality ready for microscope inspection to determine quality and completeness of the polishing method.

DESCRIPTION OF THE PREFERRED EMBODIMENTS

Figure 1:
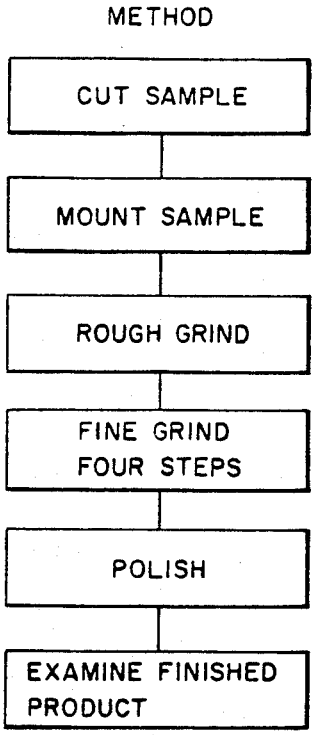
FIG. 1 is a diagram illustrating the sequence in which the various steps of the method are performed.
Figure 2:
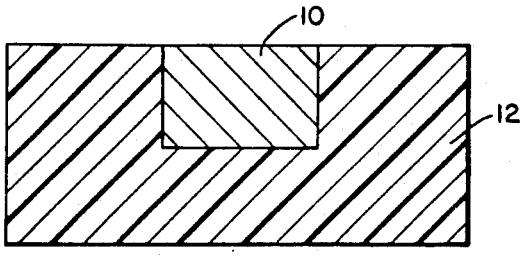
FIG. 2 is a section view illustrating the sample with the encapsulating support material encompassing the sample.

As seen in the drawing, a sample specimen 10 is encapsulated in a suitable plastic material of either thermosetting or epoxy resin material 12 prior to metallographic preparation of the sample for microscopic examination thereof. The sample is then subjected to preparation by rough grinding, fine grinding and polishing.

Stage I—Rough Grinding

Samples are rough ground on a belt surfacer using a 180 grit silicon carbide belt with water and water soluable oil as a lubricant. The purpose of this stage is to remove rough areas that resulted from the cutting operation and to obtain a flat surface prior to the fine grinding stage. Samples are cleaned in running water after rough grinding. A similar rough grinding procedure is set forth in a patent application entitled "Metallographic Preparation of Particulate Filled Aluminum Metal Matrix Composite Material" filed by Eugene L. Goodwin on June 24, 1985, U.S. Pat. Ser. No. 747,741 and issued July 15, 1986 as U.S. Pat. No. 4,599,827. While the rough grinding process is similar, the fine grinding and polishing steps are not and, therefore, does not result in overpolishing the E-glass-epoxy sample of the present disclosure.

Stage II—Fine Grinding

Fine grinding is accomplished in four steps with a pregrinder and lubricant as described.

| Abrasive Paper | Lubricant |
|---|---|
| Step 1 - 240 grit silicon carbide | Water |
| Step 2 - 320 grit silicon carbide | Water |
| Step 3 - 400 grit silicon carbide | Water |
| Step 4 - 600 grit silicon carbide | Water |

The purpose of the fine grinding is to obtain the best possible surface that is flat, scratch-free, and relatively free of disturbed areas. Samples are cleaned after each grinding step with running water before proceeding to the next finer grit.

The polishing operation is accomplished by lapping the face of the sample on a flat wheel which is cloth-covered and impregnated with the proper polishing media. The wheel is lubricated with a compatible fluid.

Stage III—Polishing

Polishing is done on a flat bronze wheel covered with a microcloth impregnated with a water slurry of 0.3 micron alumina powder and a laboratory liquid detergent. Medium to heavy pressure is applied for 10–15 seconds, then light pressure for 10–15 seconds at a wheel speed of 1000 RPM. The sample is washed in warm running water, rinsed with alcohol and dried by hot air from a heat gun. The sample is ready for microscopic examination.

The use of water soluble oil in belt surfacing is discussed on page 17 of the *AB Metal Digest* entitled "Cutters for Metallography and Petrography," Vol. M, Number 1—A. Water soluble oil is also manufactured under the name of ISOCUT by Buehler, Ltd.

I claim:

1. A method of preparing samples of E-Glass-Epoxy composite material for microscopic examination thereof comprising the steps of:

a. selecting a sample from the parent material;
b. encapsulating said sample;
c. rough grinding said sample for removing rough edges resulting from the cutting operation, said rough grinding being accomplished on a belt surfacer using a 180 grit silicon carbide belt with water soluble oil as a lubricant;
d. cleaning said sample in running water;
e. fine grinding said sample on a pregrinder in a series of grinding steps with water soluble oil as a lubricant, each step accomplished with a finer grit of grinding material to obtain a relatively flat, scratch-free surface;
f. cleaning said sample in running water;
g. polishing said material on a flat bronze wheel covered with a microcloth impregnated with a water slurry of 0.3 micron alumina powder and a liquid detergent by applying varying pressures for a predetermined length of time; and,
h. cleaning and drying said sample.

2. A method of preparing samples of E-Glass-Epoxy composite material as set forth in claim 1 wherein said series of fine grinding steps is four grinding steps; said first grinding step being accomplished using a 240 grit silicon carbide grinding material; said second grinding step being accomplished using a 320 silicon carbide grinding material; said third grinding step being accomplished using a 400 grit silicon carbide grinding material and said fourth grinding step being accomplished using a 600 grit silicon carbide grinding material to obtain said relatively flat, scratch-free surface.

3. A method of preparing samples of E-Glass-Epoxy composite material as set forth in claim 2 wherein said step of polishing said material by applying varying pressures for a predetermined length of time consists of applying heavy pressure for 10–15 seconds and subsequently applying light pressure for 10–15 seconds, said pressures being applied for said predetermined time at a grinding wheel speed of 1,000 RPM.

* * * * *